United States Patent
Jang et al.

(10) Patent No.: US 10,468,652 B2
(45) Date of Patent: Nov. 5, 2019

(54) SEPARATOR FOR LITHIUM SECONDARY BATTERY AND MANUFACTURING METHOD THEREFOR

(71) Applicant: LG Chem, Ltd., Seoul (KR)

(72) Inventors: Dae-Sung Jang, Daejeon (KR);
Dong-Wook Sung, Daejeon (KR);
Ji-Eun Kim, Daejeon (KR); Joo-Sung Lee, Daejeon (KR)

(73) Assignee: LG Chem, Ltd. (KR)

( * ) Notice: Subject to any disclaimer, the term of this patent is extended or adjusted under 35 U.S.C. 154(b) by 95 days.

(21) Appl. No.: 15/554,104

(22) PCT Filed: Apr. 22, 2016

(86) PCT No.: PCT/KR2016/004253
§ 371 (c)(1),
(2) Date: Aug. 28, 2017

(87) PCT Pub. No.: WO2016/171519
PCT Pub. Date: Oct. 27, 2016

(65) Prior Publication Data
US 2018/0040868 A1 Feb. 8, 2018

(30) Foreign Application Priority Data
Apr. 22, 2015 (KR) ........................ 10-2015-0056819

(51) Int. Cl.
*H01M 2/14* (2006.01)
*H01M 2/16* (2006.01)
*H01M 10/0525* (2010.01)

(52) U.S. Cl.
CPC ........... *H01M 2/166* (2013.01); *H01M 2/145* (2013.01); *H01M 2/1646* (2013.01);
(Continued)

(58) Field of Classification Search
CPC .. H01M 2/145; H01M 2/1646; H01M 2/1653; H01M 2/166; H01M 2/1686; H01M 10/0525
See application file for complete search history.

(56) References Cited

U.S. PATENT DOCUMENTS

2009/0111025 A1   4/2009   Lee et al.
2014/0272532 A1   9/2014   Park et al.
(Continued)

FOREIGN PATENT DOCUMENTS

JP   2012190547 A   10/2012
KR   20060072065 A   6/2006
(Continued)

OTHER PUBLICATIONS

Search report from International Application No. PCT/KR2016/004253, dated Aug. 3, 2016.

*Primary Examiner* — Brittany L Raymond
(74) *Attorney, Agent, or Firm* — Lerner, David, Littenberg, Krumholz & Mentlik, LLP

(57) ABSTRACT

Provided are a separator for a lithium secondary battery and a manufacturing method therefor. In order to improve processability and cell stability by increasing the bonding force between a separator and a coating layer, the separator comprises: a porous polymer substrate having a plurality of pores; a porous coating layer formed on at least one surface of the porous polymer substrate; and an emulsion binder layer formed between the porous polymer substrate and the porous coating layer.

12 Claims, 1 Drawing Sheet

(52) U.S. Cl.
CPC ....... *H01M 2/1653* (2013.01); *H01M 2/1686* (2013.01); *H01M 10/0525* (2013.01)

(56) References Cited

U.S. PATENT DOCUMENTS

| | | |
|---|---|---|
| 2015/0140404 A1 | 5/2015 | Yoo et al. |
| 2015/0188108 A1* | 7/2015 | Miyazawa .......... H01M 2/1653 429/145 |
| 2015/0270523 A1* | 9/2015 | Toyoda ................ H01M 2/145 429/145 |
| 2015/0303427 A1 | 10/2015 | Hyun et al. |

FOREIGN PATENT DOCUMENTS

| | | |
|---|---|---|
| KR | 20070000231 A | 1/2007 |
| KR | 101298340 B1 | 8/2013 |
| KR | 101341196 B1 | 12/2013 |
| KR | 20130137390 A | 12/2013 |
| KR | 20140050877 A | 4/2014 |
| KR | 20140073957 A | 6/2014 |
| KR | 20140112384 A | 9/2014 |

* cited by examiner

SEPARATOR FOR LITHIUM SECONDARY BATTERY AND MANUFACTURING METHOD THEREFOR

CROSS-REFERENCE TO RELATED APPLICATIONS

The present application is a national phase entry under 35 U.S.C. § 371 of International Application No. PCT/KR2016/004253, filed Apr. 22, 2016, which claims priority to Korean Patent Application No. 10-2015-0056819, filed in the Republic of Korea on Apr. 22, 2015, the disclosures of which are incorporated herein by reference.

TECHNICAL FIELD

The present disclosure relates to a separator for a lithium secondary battery and a manufacturing method therefor.

BACKGROUND ART

Recently, there has been an increasing interest in energy storage technology day by day. As the application field of energy storage technology has been extended to mobile phones, camcorders, lap-top computers, and even electric cars, many efforts have been devoted to studying and developing electrochemical devices. In this aspect, electrochemical devices are attracting more attention, and especially, development of rechargeable secondary batteries is the focus of attention.

Electrochemical devices have been long studied, and those with greatly improved performance of electrode active materials, especially output, have been developed. In currently available secondary batteries, lithium secondary batteries developed in early 1990's have higher operating voltage and higher energy density a traditional batteries such as Ni-MH batteries, and by virtue of these advantages, lithium secondary batteries are gaining much attention. However, lithium secondary batteries have risks of heat generation and eventual explosion due to the environment in which the batteries are used.

Electrochemical devices are produced by many manufacturers, and each shows different safety characteristics. Assessment and management of the safety of electrochemical batteries is very grave. The most important consideration is that electrochemical devices should not cause injury to users in the event of malfunction, and for this purpose, Safety Regulations strictly prohibit fire and flame in electrochemical devices. In the safety characteristics of electrochemical devices, overheating and eventual thermal runaway in electrochemical devices or piercing of separators poses a high risk of explosion. Particularly, polyolefin-based porous substrates commonly used for separators of electrochemical devices show extremely severe thermal shrinking behaviors at the temperature of 100° C. or above due to their properties of materials and manufacturing processes including stretching, causing a short circuit between positive and negative electrodes.

To solve the safety problem of electrochemical devices, Korean Patent Publication Nos. 10-2006-72065 and 10-2007-231 proposed an organic/inorganic composite separator having a porous active layer, in which the porous active layer is formed by coating a mixture of inorganic particles and a binder polymer on at least one surface of a porous substrate having a plurality of pores. In the organic/inorganic composite separator, the inorganic particles in the porous active layer coated on the porous substrate serve as a sort of spacer to mechanically maintain the shape of the porous active layer, thereby suppressing the thermal contraction of the porous substrate when the electrochemical device is overheated. Furthermore, interstitial volume between the inorganic particles forms micropores.

As described above, for the porous active layer coated on the organic/inorganic composite separator to suppress the thermal contraction of the porous substrate, the inorganic particles need to be present in a predetermined amount or more. However, as the content of the inorganic particles becomes higher, the content of the binder polymer becomes relatively lower, and thus the inorganic particles of the porous active layer may get unstuck due to stress occurring in the assembly process of the electrochemical device including winding. The unstuck inorganic particles act as local defects of the electrochemical device and have a bad influence on the safety of the electrochemical device.

DISCLOSURE

Technical Problem

The present disclosure is directed to providing a separator for a lithium secondary battery with improved binding between the separator and a coating layer and improved processability and cell safety, and a manufacturing method therefor.

Technical Solution

To achieve the object, the present disclosure provides a separator for a lithium secondary battery including a porous polymer substrate having a plurality of pores, and a porous coating layer formed on at least one surface of the porous polymer substrate, wherein the separator comprises an emulsion binder layer between the porous polymer substrate and the porous coating layer.

Preferably, the emulsion binder layer may be formed from an emulsion solution in which a first polymer binder is dispersed in a solvent.

The first polymer binder may be at least one selected from the group consisting of polymethylmethacrylate, poly(butyl methacrylate-co-methyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide.

The first polymer binder may be present in an amount of 0.1 to 5 wt % of the porous coating layer.

Preferably, the emulsion binder layer may be 10 to 1000 nm thick.

Preferably, the porous coating layer may include organic particles, inorganic particles, or their mixtures.

The organic particles may be particles of at least one selected from the group consisting of polystyrene, 2-(((butoxyamino)carbonyl)oxy)ethylmethacrylate, 2-(diethylamino)ethylmethacrylate, 2-(dimethylamino)ethylmethacrylate, 3-(diethylamino)propylmethacrylate, 3-(dimethylamino)propylmethacrylate, methyl 2-acetoamidomethacrylate, 2-methacrylamidoglycolic acid, 2-methacrylamido-2-methyl-1-propanesulfonic acid, (3-methacrylamidopropyl)trimethyl ammonium chloride, N-methacryloylamido-ethoxyethanol, 3-methacryloyl amino-1-propanol, N-(butoxymethyl) methacryloamide, N-tert-butylmethacrylamide, diacetonemethacrylamide, N,N-dimethylmethacrylamide, N-(isobutoxymethyl)acrylamide, N-(isopropyl)methacrylamide, methacrylamide, N-phenylmethacrylamide, N-(tris(hydroxymethyl)methyl)methacrylamide, N—N'-(1,3-phenylene)dimaleimide, N—N'-(1,4-phenylene)dimaleimide, N—N'-(1,2-dihydroxyethylene)bisacrylamide, N—N'(1,4-phenylene)dimaleimide, N—N'-(1,2-dihydroxyethylene)bisacrylamide, N—N'-ethylenebismethacrylamide, and N-vinylpyrrolidinone.

The inorganic particles may be inorganic particles having a dielectric constant of 5 or greater, inorganic particles having ability to transport lithium ion, or their mixtures.

The inorganic particles may be at least one selected from the group consisting of $SiO_2$, $Al_2O_3$, $TiO_2$, $BaTiO_3$, $Li_2O$, LiF, LiOH, $Li_3N$, BaO, $Na_2O$, $Li_2CO_3$, $CaCO_3$, $LiAlO_2$, $SrTiO_3$, $SnO_2$, $CeO_2$, MgO, NiO, CaO, ZnO, $ZrO_2$, SiC, and their derivatives and their mixtures.

The porous coating layer may further include a second polymer binder.

The second polymer binder may be at least one copolymer selected from the group consisting of acrylonitrile-co-maleic anhydride, acrylonitrile-co-vinylalcohol, cyanoethylene-co-vinylalcohol, cyanoethylene-co-cellulose, cyanoethylene-co-sucrose, acrylonitrile-co-acrylic acid, acrylonitrile-co-maleic anhydride, acrylate-co-acrylic acid, and acrylate-co-maleic anhydride.

The present disclosure further provides a method for manufacturing a separator for a lithium secondary battery, including (S1) forming an emulsion binder solution, (S2) coating the emulsion binder solution on a surface of a porous substrate, and (S3) forming a porous coating layer on the surface coated with the emulsion binder.

The present disclosure further provides a lithium secondary battery including a positive electrode, a negative electrode, and the aforementioned separator interposed between the positive electrode and the negative electrode.

Advantageous Effects

The separator according to an aspect of the present disclosure has improved binding between a separator substrate and a coating layer, thereby reducing the possibility of being peeled off during cell assembly and improving processability.

Furthermore, the separator according to an aspect of the present disclosure reduces an amount of binder in a slurry, lowers the resistance, and helps improve the electrolyte solution wettability.

MODE FOR CARRYING OUT THE INVENTION

Hereinafter, the present disclosure will be described in detail. Prior to the description, the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, configuration presented in the embodiments stated herein is just a most preferred embodiment of the present disclosure and does not fully represent the technical concept of the present disclosure, so it should be understood that there may be various equivalents and modifications for alternative embodiments at the time the application is filed.

Figure 1:
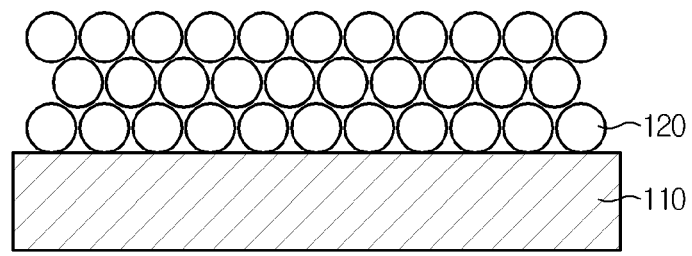
FIG. 1 is a cross-sectional view of a separator for a lithium secondary battery according to related art.
Figure 2:
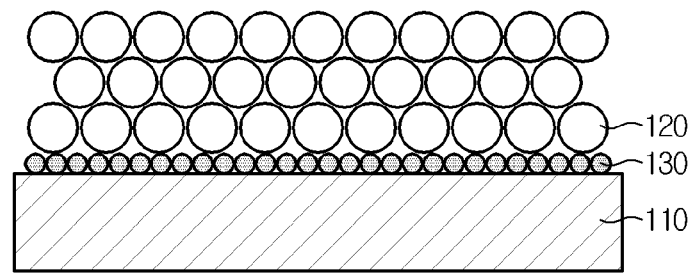
FIG. 2 is a cross-sectional view of a separator for a lithium secondary battery according to an embodiment of the present disclosure.

FIG. 1 is a cross-sectional view of a separator for a lithium secondary battery according to related art, and FIG. 2 is a cross-sectional view of a separator for a lithium secondary battery according to an embodiment of the present disclosure.

The separator according to an aspect of the present disclosure includes a porous polymer substrate 110 having a plurality of pores; and a porous coating layer 120 formed on at least one surface of the porous polymer substrate, and the separator includes an emulsion binder layer 130 between the porous polymer substrate and the porous coating layer. As opposed to the conventional separator, the separator includes the emulsion binder layer through pre-treatment to improve the adhesion of the porous coating layer and enhance the cell performance and safety.

The emulsion binder layer may be formed from an emulsion solution in which a first polymer binder is dispersed in a solvent.

The solvent may be water or an organic solvent, and the organic solvent includes carbonate-based, ester-based, ether-based, ketone-based, alcohol-based or aprotic solvents.

The first polymer binder includes any porous polymer substrate commonly used in electrochemical devices. The first polymer binder may be at least one selected from the group consisting of polymethylmethacrylate, poly(butyl methacrylate-co-methyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide.

The first polymer binder may be present in an amount of 0.1 to 5 wt % of the porous coating layer, and preferably 1 to 1.5 wt %.

The emulsion binder layer may be 10 to 1000 nm thick. Preferably, the emulsion binder layer may be 100 to 1000 nm thick.

The porous coating layer may include organic particles, inorganic particles, or their mixtures.

The organic particles include particles of at least one selected from the group consisting of polystyrene, 2-(((butoxyamino)carbonyl)oxy)ethylmethacrylate, 2-(diethylamino)ethylmethacrylate, 2-(dimethylamino)ethylmethacrylate, 3-(diethylamino)propylmethacrylate, 3-(dimethylamino)propylmethacrylate, methyl 2-acetoamidomethacrylate, 2-methacrylamidoglycolic acid, 2-methacrylamido-2-methyl-1-propanesulfonic acid, (3-methacrylamidopropyl)trimethyl ammonium chloride, N-methacryloylamido-ethoxyethanol, 3-methacryloyl amino-1-propanol, N-(butoxymethyl)methacryloamide, N-tert-butylmethacrylamide, diacetonemethacrylamide, N,N-dimethylmethacrylamide, N-(isobutoxymethyl)acrylamide, N-(isopropyl)methacrylamide, methacrylamide, N-phenylmethacrylamide, N-(tris(hydroxymethyl)methyl)methacrylamide, N—N'-(1,3-phenylene)dimaleimide, N—N'-(1,4-phenylene)dimaleimide, N—N'-(1,2-dihydroxyethylene)bisacrylamide, N—N'(1,4-phenylene)dimaleimide, N—N'-(1,2-dihydroxyethylene)bisacrylamide, N—N'-ethylenebismethacrylamide, and N-vinylpyrrolidinone.

The inorganic particles are not limited to a particular type so long as they are electrochemically stable. That is, inorganic particles that can be used in the present disclosure are not limited to a particular type if they do not cause any oxidation and/or reduction reaction in the operating voltage range (for example, 0 to about 5V for Li/Li+) of an electrochemical device used. Particularly, the use of inorganic particles having the ability to transport ion increases ionic conductivity in electrochemical devices, contributing to the performance improvement.

Furthermore, the use of inorganic particles having a high dielectric constant contributes to the increase in dissolution rate of electrolyte salts, for example, lithium salts, in a liquid electrolyte, thereby increasing ionic conductivity of an electrolyte solution.

By the foregoing reasons, the inorganic particles may include inorganic particles having a dielectric constant of 5 or greater, for example, high dielectric constant inorganic particles having about 10 or greater, inorganic particles having the ability to transport lithium ions, or their mixtures. Non-limiting examples of the inorganic particles having a dielectric constant of about 5 or greater include $BaTiO_3$, $Pb(Zr,Ti)O_3(PZT)$, $Pb_{1-x}La_xZr_{1-y}Ti_yO_3(PLZT)$, $PB(Mg_{1/3}Nb_{2/3})O_3$—$PbTiO_3(PMN-PT)$, hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, or their mixtures.

Particularly, inorganic particles such as $BaTiO_3$, $Pb(Zr,Ti)O_3(PZT)$, $Pb_{1-x}La_xZr_{1-y}Ti_yO_3(PLZT)$, $PB(Mg_{1/3}Nb_{2/3})O_3$—$PbTiO_3(PMN-PT)$, and hafnia ($HfO_2$) exhibit high dielectric properties of a dielectric constant of about 100 or greater, as well as piezoelectricity that is the appearance of a potential difference across two surfaces due to electric charge generated when stretched or compressed by the application of predetermined pressure, thereby preventing the occurrence of an internal short circuit between two electrodes caused by external impacts, contributing to the improvement of safety of electrochemical devices. Furthermore, when the high dielectric constant inorganic particles and the inorganic particles having the ability to transport lithium ion are used in combination, their synergistic effect can be greatly magnified.

The inorganic particles having the ability to transport lithium ion refer to inorganic particles which contain lithium atoms but do not store lithium, and have a function to move lithium ion, and because the inorganic particles having the ability to transport lithium ion can transfer and move lithium ion due to a sort of defect present in the particle structure, it is possible to improve lithium ionic conductivity in batteries, contributing to the improvement of the battery performance. Non-limiting examples of the inorganic particles having the ability to transport lithium ion include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAl-TiP)$_xO_y$ based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ based glass ($Li_xSi_yS_z$, $0<x<3$, $0<y<2$, $0<z<4$) such as $Li_3PO_4$—$Li_2S$—$SiS_2$, $P_2S_5$ based glass ($Li_xP_yS_z$, $0<x<3$, $0<y<3$, $0<z<7$) such as $LiI$—$Li_2S$—$P_2S_5$, or their mixtures.

The porous coating layer may further include a second polymer binder, and the second polymer binder may be at least one copolymer selected from the group consisting of acrylonitrile-co-maleic anhydride, acrylonitrile-co-vinylalcohol, cyanoethylene-co-vinylalcohol, cyanoethylene-co-cellulose, cyanoethylene-co-sucrose, acrylonitrile-co-acrylic acid, acrylonitrile-co-maleic anhydride, acrylate-co-acrylic acid, and acrylate-co-maleic anhydride.

In addition to the organic polymer particles, the inorganic particles, and the second polymer binder, the porous coating layer may include an additional component, for example, an additive such as a thickening agent, a crosslinking agent, and a dispersant, commonly used in the art.

Non-limiting examples of the thickening agent include, but are not limited to, carboxy methyl cellulose, hydroxy ethyl cellulose, polyvinyl alcohol, and polyvinylacrylate.

Non-limiting examples of the crosslinking agent include, but are not limited to, isocyanate-based compounds, epoxy-based compounds, aziridine-based compounds, or metal chelate-based compounds.

According to another aspect of the present disclosure, there is provided an electrochemical device, for example, a lithium secondary battery, including a positive electrode, a negative electrode, and a separator interposed between the positive electrode and the negative electrode.

According to another aspect of the present disclosure, there is provided a method for manufacturing a separator for a lithium secondary battery including (S1) forming an emulsion binder solution, (S2) coating the emulsion binder solution on a surface of a porous substrate, and (S3) forming a porous coating layer on the surface coated with the emulsion binder.

In step (S1), a polymer binder is dispersed in a solvent to form an emulsion binder solution. The emulsion binder solution may further include a dispersant. The solvent may include a polymer binder in an amount of about 5 to 90 parts by weight per 100 total parts by weight of the emulsion binder solution.

In step (S2), a method for coating the emulsion binder solution may include common coating methods known in the art, and for example, may use various processes such as dip coating, die coating, roll coating, comma coating, or their combination. Furthermore, the emulsion binder may be selectively coated on one or two surfaces of the porous substrate. Furthermore, coating of the emulsion binder solution may be performed by coating on a release film and transferring.

The step (S3) includes forming a porous coating layer on the surface coated with the emulsion binder using common coating methods known in the art, for example, various processes such as dip coating, die coating, roll coating, comma coating, or their combination.

As described above, the separator of the present disclosure manufactured by the manufacturing method can be used as a separator of an electrochemical device.

That is, for the separator interposed between the positive electrode and the negative electrode, the separator according to an embodiment of the present disclosure can be usefully applied.

The electrochemical device includes any type of device capable of facilitating electrochemical reactions, and specifically, includes, for example, any type of primary and secondary battery, fuel cell, solar cell or capacitor such as supercapacitor. Particularly, the secondary battery is preferably a lithium secondary battery including a lithium metal secondary battery, a lithium ion secondary battery, a lithium polymer secondary battery, or a lithium ion polymer secondary battery.

The electrochemical device may be manufactured according to common methods known in the art, and for example, may be manufactured by assembling positive and negative electrodes with the separator interposed between, and pouring an electrolyte solution.

There is no particular limitation on the electrode to be applied with the separator according to an embodiment of the present disclosure, and the electrode may be manufactured by binding an electrode active material to an electrode current collector according to common methods known in the art. Of the electrode active material, non-limiting examples of the positive electrode active material include general positive electrode active materials commonly used in a positive electrode of electrochemical devices, and particularly it is preferred to use lithium manganese oxide, lithium cobalt oxide, lithium nickel oxide, lithium iron oxide, or lithium composite oxide thereof. Non-limiting examples of the negative electrode active material include general negative electrode active materials commonly used in a negative electrode of electrochemical devices, and particularly, lithium intercalation materials such as lithium metal or lithium alloy, carbon, petroleum coke, activated carbon, graphite, or other carbon materials are desirable. Non-limiting examples of the positive electrode current collector include foils made of aluminum, nickel or their combination, and non-limiting examples of the negative electrode current collector include foils made of copper, gold, nickel or copper alloy or their combination.

The electrolyte solution that can be used in an embodiment of the present disclosure includes, but is not limited to, electrolyte solutions in which a salt is dissolved or dissociated in an organic solvent, the salt having a structure represented by, for example, $A^+B^-$ where $A^+$ is an alkali metal cation such as $Li^+$, $Na^+$, $K^+$, or their combination, and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or their combination, and the organic solvent including propylene carbonate (PC), ethylene carbonate (EC), diethylcarbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone (NMP), ethylmethylcarbonate (EMC), γ-butyrolactone, or their mixtures.

The pouring of the electrolyte solution is performed in any suitable step of a battery fabrication process based on a manufacturing process and required properties of a final product. That is, the pouring of the electrolyte solution is applied before battery assembly or in the final step of battery assembly.

A process of applying the separator according to an embodiment of the present disclosure to a battery includes a general process such as winding, and a lamination or stack process and a folding process for the separator and the electrode. Particularly, when the separator of the present disclosure is applied to the lamination or stack process, the thermal stability improvement effect of the electrochemical device markedly increases. This is because a battery manufactured by the lamination or stack and folding processes is subjected to severer thermal contraction of a separator than a battery manufactured by a general winding process. Furthermore, when the separator of the present disclosure is applied to the lamination or stack process, assembling at higher temperatures can be easily accomplished by virtue of good thermal stability and adhesive properties of binder with crosslinked structure.

Hereinafter, examples are described in detail to specifically explain the present disclosure. The examples according to the present disclosure, however, may be modified in many other forms, and the scope of the present disclosure should not be construed as being limited to the following examples. The examples of the present disclosure are provided to explain the present disclosure more clearly and fully to those having ordinary knowledge in the art to which the present disclosure pertains.

EXAMPLE

A 16 μm thick polyethylene porous substrate (Celgard, PP1615) was prepared.

5 parts by weight of acrylic emulsion (poly(butyl methacrylate-co-methyl methacrylate)) as a first polymer binder was added to 95 parts by weight of distilled water as a solvent, and dispersed at 25° C. for about 10 minutes to prepare an emulsion binder solution.

Alumina particles having an average particle size of 0.7 μm and BET of 4 m²/g were mixed at a 10:90 ratio of binder:inorganics and dispersed to prepare a porous coating layer-forming slurry.

The emulsion binder solution and the porous coating layer-forming slurry were coated on the porous substrate in a sequential order by a double-layer slide-slot coating method to form an emulsion binder and a porous coating layer, respectively. The thickness of the emulsion coating layer was adjusted to the range between 0.1 μm and 0.5 μm, and the thickness of the porous coating layer was adjusted to the range between about 2 μm and about 3 μm.

Comparative Example 1

The same separator as example was manufactured except the emulsion binder layer is absent.

Comparative Example 2

The same separator as example was manufactured except that a binder layer having a thickness of 0.1 μm to 0.5 μm is formed using 2-ethylhexylacrylate, instead of the emulsion binder layer.

Measurement of Peel Strength

The separators of example and comparative examples 1 and 2 were prepared in 15×70 mm size, and each was measured five times by the following measuring method. A double-sided adhesive tape was attached to a slide glass, the prepared separator was attached to the double-sided adhesive tape such that the separator surface having the formed coating layer was adhered on the double-sided adhesive tape, and a PET film of 20×100 mm size was attached to the lower end part of the separator that was not attached to the double-sided adhesive tape, using a single-sided adhesive tape.

The slide glass having the separator adhered thereon was fixed to the lower holder of universal testing machine (UTM). The PET film connected to the separator was fixed to the upper holder of UTM (upper holder: pulling side, lower holder: fixed side). The UTM was set to the peel test mode with the peel speed of 300 mm/min and peel distance of 40 mm. The holder was lifted up (pulled) in manual mode to separate the coating layer from the tape by about 2 mm, and the holder was lifted down to set the tension acting on the separator to 0. This condition was set to the distance of 0 mm and 0 N. By pulling at the set speed, the adhered part between the coating layer and the double-sided adhesive tape got unstruck, and the adhesion force for each distance was recorded in gf.

The measured results are shown in the following Table 1.

TABLE 1

| Unit: gf | Example | Comparative example 1 | Comparative example 2 |
|---|---|---|---|
| 1st | 132 | 82.3 | 105 |
| 2nd | 120.5 | 74.3 | 108 |
| 3rd | 121.5 | 62.5 | 109.5 |
| 4th | 127.5 | 73.4 | 102 |
| 5th | 126 | 85.6 | 106.5 |
| Average | 125.5 | 75.6 | 106.2 |

Referring to Table 1 above, it can be seen that the separator of example having an emulsion binder layer has superior binding between the porous substrate and the porous coating layer over comparative examples 1 and 2 having no emulsion binder layer or a conventional binder layer.

While the present disclosure has been hereinabove described with regard to a limited number of embodiments and drawings, the present disclosure is not limited thereto and it is obvious to those skilled in the art that various changes and modifications can be made thereto within the technical aspects of the present disclosure and the scope of equivalents to which the appended claims are entitled.

What is claimed is:

1. A separator for a lithium secondary battery, comprising:
a porous polymer substrate having a plurality of pores, wherein the porous polymer substrate has a first outer surface configured to contact a positive or negative electrode of the lithium secondary battery;
a porous coating layer, wherein the porous coating layer has a second outer surface configured to contact the positive or negative electrode of the lithium secondary battery, wherein the first and second outer surfaces are on opposite sides of the separator; and
an emulsion binder layer disposed between the porous polymer substrate and the porous coating layer, wherein the surfaces of the emulsion binder layer are not configured to contact the positive or negative electrode.

2. The separator for a lithium secondary battery according to claim 1, wherein the emulsion binder layer is formed from an emulsion solution in which a first polymer binder is dispersed in a solvent.

3. The separator for a lithium secondary battery according to claim 2, wherein the first polymer binder is at least one selected from the group consisting of polymethylmethacrylate, poly(butyl methacrylate-co-methyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide.

4. The separator for a lithium secondary battery according to claim 2, wherein the first polymer binder is present in an amount of 0.1 to 5 wt % of the porous coating layer.

5. The separator for a lithium secondary battery according to claim 1, wherein the emulsion binder layer is 10 to 1000 nm thick.

6. The separator for a lithium secondary battery according to claim 1, wherein the organic particles are particles of at least one selected from the group consisting of polystyrene, 2-(((butoxyamino)carbonyl)oxy)ethylmethacrylate, 2-(diethylamino)ethylmethacrylate, 2-(dimethylamino)ethylmethacrylate, 3-(diethylamino)propylmethacrylate, 3-(dimethylamino)propylmethacrylate, methyl 2-acetoamidomethacrylate, 2-methacrylamidoglycolic acid, 2-methacrylamido-2-methyl-1-propanesulfonic acid, (3-methacrylamidopropyl)trimethyl ammonium chloride, N-methacryloylamido-ethoxyethanol, 3-methacryloyl amino-1-propanol, N-(butoxymethyl) methacryloamide, N-tert-butylmethacrylamide, diacetonemethacrylamide, N,N-dimethylmethacrylamide, N-(isobutoxymethyl)acrylamide, N-(isopropyl)methacrylamide, methacrylamide, N-phenylmethacrylamide, N-(tris(hydroxymethyl)methyl) methacrylamide, N—N'-(1,3-phenylene)dimaleimide, N—N'-(1,4-phenylene)dimaleimide, N—N'-(1,2-dihydroxyethylene)bisacrylamide, N—N'(1,4-phenylene)dimaleimide, N—N'-(1,2-dihydroxyethylene)bisacrylamide, N—N'-ethylenebismethacrylamide, and N-vinylpyrrolidinone.

7. The separator for a lithium secondary battery according to claim 1, wherein the inorganic particles are inorganic particles having a dielectric constant of 5 or greater, inorganic particles having ability to transport lithium ion, or their mixtures.

8. The separator for a lithium secondary battery according to claim 1, wherein the inorganic particles are at least one selected from the group consisting of $SiO_2$, $Al_2O_3$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $SrTiO_3$, $SnO_2$, $CeO_2$, $MgO$, $NiO$, $CaO$, $ZnO$, $ZrO_2$, $SiC$, and their derivatives and their mixtures.

9. The separator for a lithium secondary battery according to claim 1, wherein the porous coating layer further comprises a second polymer binder.

10. The separator for a lithium secondary battery according to claim 9, wherein the second polymer binder is at least one copolymer selected from the group consisting of acrylonitrile-co-maleic anhydride, acrylonitrile-co-vinylalcohol, cyanoethylene-co-vinylalcohol, cyanoethylene-co-cellulose, cyanoethylene-co-sucrose, acrylonitrile-co-acrylic acid, acrylonitrile-co-maleic anhydride, acrylate-co-acrylic acid, and acrylate-co-maleic anhydride.

11. A method for manufacturing a separator for a lithium secondary battery, comprising:
coating an emulsion binder solution on a surface of a porous polymer substrate to form an emulsion binder layer on the surface of the porous polymer substrate, where the emulsion binder solution comprises a first polymer binder dispersed in a solvent; and
forming a porous coating layer on a surface of the emulsion binder layer that is opposite the porous polymer substrate, wherein the porous coating layer comprising a second polymer binder and at least one of inorganic particles or organic particles,
wherein outer surfaces of the porous polymer substrate and porous coating layer are configured to contact a positive or negative electrode of the lithium secondary battery, and
wherein the surfaces of the emulsion binder layer are not configured to contact the positive or negative electrode.

12. A lithium secondary battery comprising:
a positive electrode, a negative electrode, and the separator of claim 1 interposed between the positive electrode and the negative electrode.

* * * * *